US008166828B2

(12) United States Patent
Skirda et al.

(10) Patent No.: US 8,166,828 B2
(45) Date of Patent: May 1, 2012

(54) FLUID FLOW METER

(75) Inventors: Anatoly Skirda, Hermantown, MN (US); Richard Mehus, Richfield, MN (US); William M. Christensen, Hibbing, MN (US); Scott Limback, St. Paul, MN (US)

(73) Assignee: Ecolab USA, Inc., St. Paul, MN (US)

( * ) Notice: Subject to any disclaimer, the term of this patent is extended or adjusted under 35 U.S.C. 154(b) by 91 days.

(21) Appl. No.: 12/851,598

(22) Filed: Aug. 6, 2010

(65) Prior Publication Data

US 2012/0031195 A1    Feb. 9, 2012

(51) Int. Cl.
G01G 1/56 (2006.01)

(52) U.S. Cl. .................................................. 73/861.08

(58) Field of Classification Search .................. 73/261, 73/861.77, 861.79, 861.78
See application file for complete search history.

(56) References Cited

U.S. PATENT DOCUMENTS

| | | | |
|---|---|---|---|
| 3,759,099 A | 9/1973 | McGregor |
| 4,209,258 A | 6/1980 | Oakes |
| 4,410,949 A | 10/1983 | Huellinghorst et al. |
| 4,431,690 A | 2/1984 | Matt et al. |
| 4,440,030 A | 4/1984 | Pounder et al. |
| 4,878,454 A | 11/1989 | Cann |
| 4,996,888 A | 3/1991 | Foran et al. |
| 5,099,699 A | 3/1992 | Kobold |
| 5,305,916 A | 4/1994 | Suzuki et al. |
| 5,325,715 A | 7/1994 | Foran, Jr. et al. |
| 5,704,767 A | 1/1998 | Johnson |
| 5,747,703 A | 5/1998 | Plisson et al. |
| 5,816,246 A | 10/1998 | Mirza |
| 5,895,847 A | 4/1999 | Steuer |
| 5,992,230 A * | 11/1999 | Scarpa et al. .................. 73/261 |
| 5,996,405 A * | 12/1999 | Bergervoet et al. ............. 73/261 |
| 6,250,151 B1 | 6/2001 | Tingleff et al. |
| 6,314,822 B1 | 11/2001 | Ford |
| 6,617,079 B1 | 9/2003 | Pillion et al. |
| 6,631,829 B1 | 10/2003 | Wagner et al. |
| 7,360,454 B2 | 4/2008 | Kawashima et al. |
| 7,374,066 B2 | 5/2008 | Jackson et al. |
| 7,523,660 B2 | 4/2009 | Albrecht et al. |
| 2005/0127313 A1 | 6/2005 | Watson |
| 2008/0202255 A1 | 8/2008 | Albrecht et al. |
| 2010/0199758 A1 | 8/2010 | Tokhtuev et al. |

FOREIGN PATENT DOCUMENTS

WO    WO2006131134 A1    12/2006

OTHER PUBLICATIONS

ECOLAB, Oval Gear Meter OGM Plus, Jan. 2009, 4 pages.

(Continued)

Primary Examiner — Jewel V Thompson
(74) Attorney, Agent, or Firm — Fredrikson & Byron, PA

(57) ABSTRACT

Fluid flow meters and methods for measuring different aspects of fluid flow with a non-contact sensor are provided. In some cases a fluid flow gear meter is provided with a fluid chamber that is sealed with a cover portion carrying the non-contact sensor. An optional separation member may be located between the cover portion and the chamber to seal the chamber. In some cases the cover portion and/or separation member are configured to transmit visible light to allow viewing of the fluid chamber, through material selection and/or the presence of viewing cavities within the material. The flow meter is optionally configured to prevent or reduce the transmission of ambient environmental radiation into the flow meter to lessen the likelihood that it may adversely affect an optical non-contact sensor used to detect movement of gears within the chamber.

26 Claims, 8 Drawing Sheets

OTHER PUBLICATIONS

OMRON, Photomicrosensor (Reflective) EE-SY171, Mar. 2005, 4 pages.
OMRON, Photomicrosensor (Reflective) EE-SY310-SY410, Mar. 2005, 4 pages.
Schott, Schott Borofloat 33, The Versatile Floated Borosilicate Glass—With an Infinite Number of Applications, May 2009, 32 pages.

* cited by examiner

FLUID FLOW METER

FIELD

The invention relates to a positive displacement fluid flow meter. More specifically, the invention relates to a gear flow meter incorporating a non-contact sensor and methods of use of such devices.

BACKGROUND

Positive displacement fluid measurement systems can be used to measure a fluid flow rate or volume. For example, dispensing systems can use feedback from a positive displacement fluid meter to control the volume of fluid dispensed. Such control systems can be used in lieu of time-on controls to more accurately dispense precise amounts of fluid.

One type of positive displacement fluid measurement system is a gear flow meter, e.g. an oval gear or lobe meter. A traditional oval gear meter provides a pair of oval gears positioned within an oval gear chamber such that the gears rotate in concert. A lobe meter, provides a pair of lobe elements within a chamber which interlock and rotate about respective axes. In each case, fluid enters the chamber through a fluid inlet and causes the gears to rotate, allowing fluid to pass around the gears to a fluid outlet within precisely measured pockets. In an oval gear meter, the pockets are defined between the rotating oval gears and the inner chamber wall. In a lobe meter, spaces between the lobes of provide the pockets. Ideally, in each case, none of the fluid being metered passes directly between the gears themselves, so that the volume of fluid exiting the chamber during each rotation is known. Thus the volume of fluid flow through a gear meter can be measured by measuring the number of rotations of the gears. Likewise flow rate can be determined from the speed with which the gears rotate.

For measuring the gear rotation, gear meters frequently include additional gears. For example, an oval gear meter can include timing gear systems located external of the chamber to translate the number of rotations of the oval gears into an appropriate signal. Oval gear and other positive displacement flow meters utilizing timing gear systems usually have a gear chamber that includes one or more shaft apertures for the shafts coupling the gears to the external timing gears. Using more recent developments, some gear meters instead use a non-contact sensor placed outside a substantially sealed chamber to determine gear movement within the chamber. For example, magnetic and optical sensors have been incorporated into gear flow meters to measure gear movement without the need for openings or apertures within the gear chamber.

Fluid flow gear meters are used in a variety of applications in which it is desirable to measure the flow of small volumes of fluids. Thus, gear meters can be exposed to different types of fluids, require different measurement capabilities, and be placed in different environmental conditions depending on the particular application. Gear meters may also employ one or more of a variety of measurement technologies. Accordingly, fluid flow meter design must account for a large number of changing conditions among different applications.

SUMMARY

Embodiments of the invention provide devices and methods for measuring different aspects of fluid flow, such as a flow volume, direction, and/or flow rate.

According to one aspect of the invention, an embodiment of the invention provides a flow meter for measuring fluid. The flow meter includes a housing that defines a chamber having a fluid inlet and a fluid outlet. The housing also has a cover portion and a separation member positioned between the cover portion and the chamber. The separation member has a continuous interior surface that provides a wall of the chamber. The flow meter also includes two gears installed within the chamber that are rotatable about axes of rotation in response to fluid flow through the chamber. The flow meter also includes a non-contact sensor that is carried by the cover portion and located outside of the chamber. The non-contact-sensor is configured to detect movement of at least one of the gears.

According to another aspect of the invention, a flow meter is provided for measuring fluid. The flow meter includes a housing that defines a chamber having a fluid inlet and a fluid outlet. Installed within the chamber are first and second gears that are rotatable about respective first and second axes of rotation in response to fluid flow through the chamber. A non-contact sensor that is configured to detect movement of at least one of the first and second gears is located outside of the chamber. The housing includes a cover portion with an exterior surface and an interior surface that forms a wall of the chamber. The cover portion includes a cavity that extends into the cover portion from the exterior surface but not through the interior surface. The cavity allows discernment of the first and the second gears through the cover portion from outside the housing.

According to another aspect of the invention, an embodiment provides a flow meter for measuring fluid that includes a housing, first and second gears, an optical sensor, and an optical filter. The housing includes a base portion that defines a chamber with a fluid inlet and a fluid outlet. The housing also includes a separation member adjacent the base portion that includes a continuous interior surface forming a wall of the chamber. In addition, the housing includes a cover portion adjacent an exterior surface of the separation member. The first and second gears are installed within the chamber and are rotatable about respective first and second axes of rotation in response to fluid flow through the chamber. The cover portion carries the optical sensor, which includes an emitter configured to emit radiation in a sensor wavelength range and a detector configured to detect radiation in the sensor wavelength range. At least a portion of the separation member is substantially transparent to the sensor wavelength range to allow sensor wavelength radiation to pass through the separation member. The optical filter includes a material that is substantially opaque to the sensor wavelength range. The optical filter is positioned to limit radiation within the sensor wavelength range from entering the chamber from outside the flow meter. In addition, the separation member includes a first material and the cover portion includes a second material different from the first material. The separation member and the cover portion transmit a sufficient amount of visible light such that the first and the second gears are discernible through the cover portion and the separation member.

According to another aspect of the invention, a method for measuring a fluid is provided. The method includes providing a flow meter having a chamber in fluid communication with a fluid source. The flow meter includes an optical sensor outside of the chamber. The chamber includes a fluid inlet, a fluid outlet, first and second gears, and a wall with at least a portion of the wall being substantially transparent to a sensor wavelength range. The method further includes dispensing the fluid through the chamber, thereby causing the first and the second gears to rotate as the fluid passes through the chamber from fluid inlet to fluid outlet. The method also includes reducing transmission from outside the flow meter into the chamber of radiation in the sensor wavelength range, emitting radiation in the sensor wavelength range into the chamber with the optical sensor, and detecting radiation in the sensor wavelength range from the chamber with the optical sensor. Rotation of the first and/or second gear is measured based on the detected radiation, and a measure of the fluid is calculated based upon the measured rotation.

Some embodiments of the invention can provide one or more of the following optional features and/or advantages. Certain embodiments employ an optical sensor that measures rotation of one or more gears. In some cases, an optical filter is provided to filter ambient radiation from the surrounding environment. Such capability may improve performance of the optical sensor. The optical filter is in some cases located on an exterior surface of the flow meter housing, but may also or instead be located on an interior surface. For example, in some cases the optical filter is located on a separation member that forms a wall of the housing chamber.

Certain embodiments provide a gear meter that can be modified depending upon the contemplated application. For example, in certain cases a flow meter is provided with a removable or interchangeable separation member. The separation member can form a wall of the fluid chamber and in some cases separates the fluid chamber from a non-contact sensor adapted to measure rotation of one or more gears within the fluid chamber. In some cases an exterior cover portion secures the separation member to the housing. In such cases the composition of the separation member can be selected to achieve a desired compatibility with a particular fluid flowing through the chamber without necessarily requiring certain physical characteristics which can instead be provided by the exterior cover portion. In some cases a separation member currently in use may be replaced by one of a number of interchangeable separation members. Such capability can be useful to, for example, replace a degraded or worn out part, or to adapt the flow meter for a different application.

Certain embodiments of the invention allow direct viewing of one or more gears of the meter from outside the meter housing. Such capability can be useful, for example, to allow visual inspection of the device operation and/or to confirm sensor outputs. In some cases the material for a fluid flow meter housing is chosen to at least allow an operator to discern movement of the gear meters within the chamber. For example, one or more parts of the meter housing may be formed from a translucent or transparent material. In some cases visibility is enhanced by one or more cavities in the cover portion of the meter, which provides a thinner section of material to view through.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

The term "fluid" is used herein to identify any continuous substance that tends to flow or conform to the outline of its container. For example, the term fluid encompasses liquids and gasses. One application of embodiments of the invention is for liquids such as liquid products and chemicals used in cleaning, washing, disinfecting, rinsing, or the like.

Figure 1:
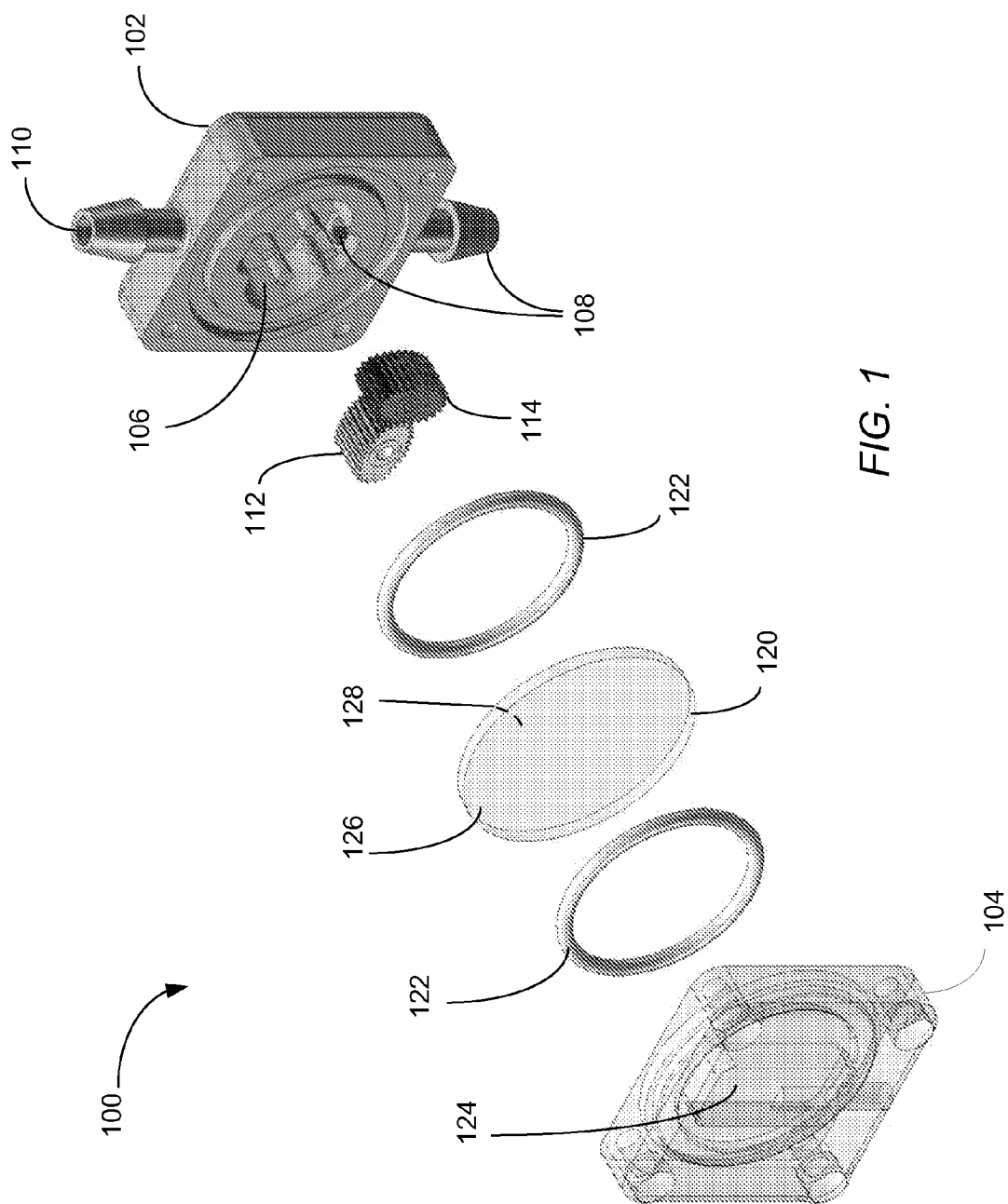
FIG. 1 is an exploded, perspective view of a flow meter according to an embodiment of the invention.
Figure 2:
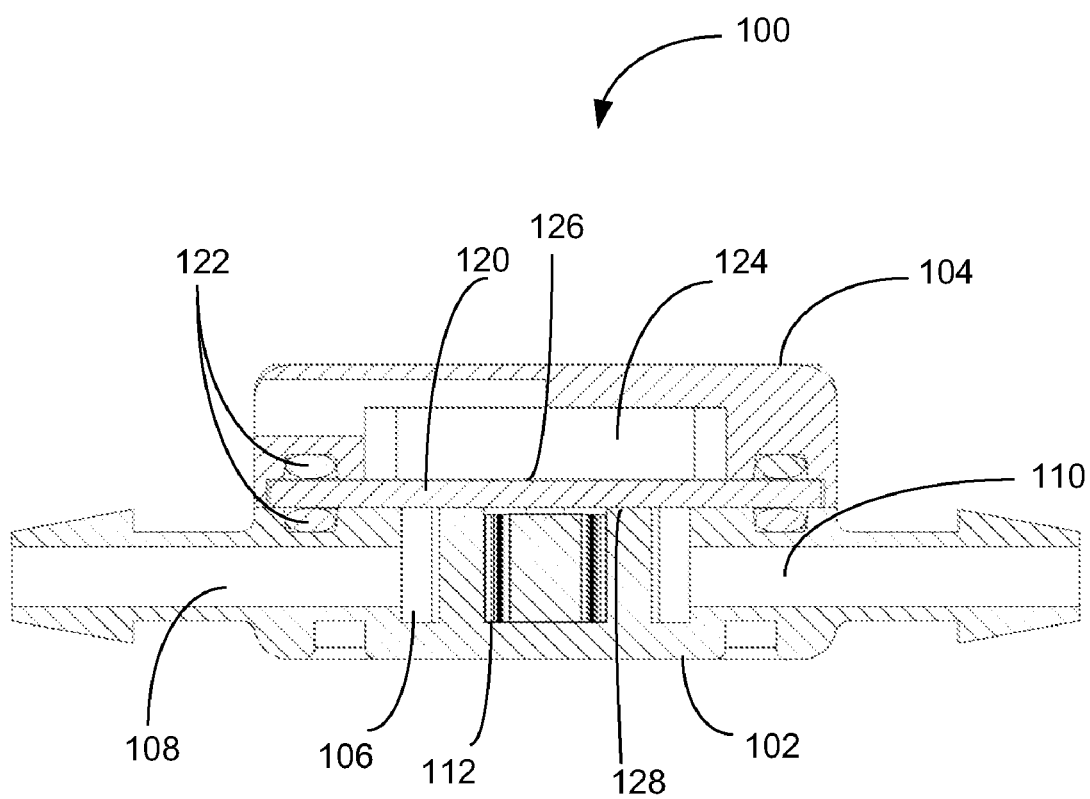
FIG. 2 is a side cross-sectional view of the flow meter of FIG. 1.

FIG. 1 is an exploded, perspective view of a flow meter 100 according to an embodiment of the invention. FIG. 2 provides a side cross-sectional view of the flow meter 100. As shown in the figures, in this embodiment of the invention the flow meter 100 has a housing that includes a base portion 102 and a cover portion 104. The base portion defines a fluid flow chamber 106 that includes a fluid inlet 108 and a fluid outlet 110. First and second gears 112, 114 are mounted within the chamber 106 and rotate about respective first and second axes of rotation in response to fluid flowing through the chamber 106.

The housing also includes a separation member 120 that is positioned adjacent the base portion 102. The separation member 120 includes a continuous interior surface 128 that forms a wall of the chamber 106. The separation member 120 is positioned between the cover portion 104 and the chamber/base portion. The cover portion 104 is secured to the base portion 102 using a number of fasteners such as screws or bolts (not shown). Two sealing members 122 (e.g., elastomer o-rings) fit against the interior 128 and exterior 126 surfaces of the separation member, between the base portion and the separation member and the cover portion and the separation member, respectively, to further seal off the fluid chamber 106 from the cover portion 104. Although not shown in FIGS.

1 and 2, the flow meter 100 also includes a non-contact sensor (e.g., an optical or magnetic sensor) configured to detect movement of the one or more of the gears. In this example the non-contact sensor is carried within a cavity 124 of the cover portion 104, outside of the fluid flow chamber 106.

In general, the flow meter 100 can be coupled into a fluid flow stream to quantify one or more characteristics of the fluid flow. As fluid enters the chamber 106, the gears 112, 114 (in this example oval gears) turn and sweep out and trap a precise volume, or pocket, of the fluid against an inner wall of the chamber. Because the chamber wall coincides with the arc of the major vertex of the gears throughout their rotation, this pocket of fluid is trapped between the chamber wall and the surface of the gear along the gear's minor axis and swept from the fluid inlet 108 to the fluid outlet 110. Moreover, because the oval gears 112, 114 are in contact throughout their entire rotation, no fluid passes between the gears. Thus, by this action, the volume of fluid flowing through fluid outlet is metered according to the known pocket volume. Characteristics such as total volume, flow rate, and flow direction can then be measured based rotation of the gears as the pockets are filled and emptied.

Each oval gear 112, 114 generally comprises a rigid material such as plastic or metal. Because the gears come into contact with the metered fluid, the choice of gear material can depend upon the fluid being metered. One possible consideration can include the durability of the gear material with respect to corrosive fluids. For example, with high concentration detergents, sanitizers, or rinse aids the gears can comprise molded or machined plastic such as Poly-Ether-Ether-Ketone (PEEK) about a ceramic axle. Other potential gear materials include crystallized plastics such as ULTEM, which has a high durability, high temperature tolerance, low thermal expansion, low moisture absorption, and is chemically inert. Additional materials can include RYTON and metals such as 316 SS.

Of course, a wide variety of gears can be used in different embodiments of the invention. The selection of gear designs can depend upon the properties of the fluid being metered. For example, a high viscosity fluid is less likely to cause slippage between traction gears, so smooth gears may be appropriate. In contrast, low viscosity and/or high lubricity fluids may require the use of intermeshing gears. Moreover, although the specific embodiments described herein are discussed primarily with regard to flow meters incorporating oval-shaped gears, the invention is not limited to such embodiments. One of ordinary skill in the art can appreciate that this invention can be practiced with a variety of positive displacement based flow meters. Embodiments of the invention are readily adaptable by one of ordinary skill to any positive displacement flow meter which operates by the delivery of discrete pockets of fluid per rotation of a flow meter element. For example, a lobe meter, which is a positive displacement flow meter which uses interlocking, lobe-shaped gear meter elements to pass fixed volume pockets of fluid through a chamber, can be adapted according to embodiments of the invention.

Various types of non-contact sensors can be incorporated into the flow meter 100 to sense movement of the gears 112, 114 from outside the fluid chamber 106. For example, in some cases one or more of the gears includes a permanent magnet (i.e., the "trigger gear") and the non-contact sensor is a magnetic (i.e., magneto-reactive) sensor. One example of a suitable magnetic sensor is described in commonly-owned U.S. Pat. No. 7,523,660, the entire content of which is hereby incorporated by reference. As the trigger gear rotates in response to fluid flow, the magnetic field generated by the permanent magnet also rotates. A magnetic sensor such as a GMR sensor (giant magneto resistance effect sensor) senses rotation of the magnetic field and generates a corresponding output signal. Thus movement of the gears and the corresponding fluid flow can be quantified. One or more GMR sensor elements may be used to monitor rotation of the trigger wheel. One example of a suitable GMR sensor is a GMR spin valve bridge sensor available from NVE corporation with identification No. NVE AAV 001-11 and AAV 002-11. Of course this is a brief overview of the operation of such a magnetic sensor and those skilled in the art will appreciate that a number of details are omitted here for brevity. In addition, other types of magnetic sensors known in the art may also be employed with the flow meter 100.

In some embodiments, the non-contact sensor is provided as an optical sensor. One example of a suitable non-contact optical sensor is described in commonly-owned U.S. patent application Ser. No. 12/369,501, filed Feb. 11, 2009, the entire content of which is hereby incorporated by reference. In some cases at least a portion of the separation member 120 is substantially transparent to a sensor wavelength range used by an optical sensor positioned adjacent an exterior surface 126 of the separation member, providing a view of the rotating gears through the separation member 120. The optical sensor can view an optical characteristic of one or both of the gears, and based upon this data, fluid volume, flow rate, and/or flow direction can be determined.

The optical sensor can be any sensor capable of detecting the optical property of the gears used to determine the gears rotational position. Sensors adapted to measure generally any optical property can be used including, for example, reflectance or transmittance. In some preferred embodiments, the optical property is reflectance. Reflectance can be measured by an optical sensor including an emitter, which emits light energy at one or a range of wavelengths and a detector which is positioned to receive reflected light of all or a portion of the range of emitted wavelengths. The light energy can be electromagnetic radiation of generally any wavelength, for example, UV, visible, infrared and other light can be used. In some preferred embodiments infrared light can be used. For example, in some embodiments, reflectance is measured with a 940 nm QRB1114 available from Fairchild Semiconductor International, Inc. Other suitable reflective sensors include a 950 nm EE-SY125 sensor, a 920 nm EE-SY310/SY410 sensor, and a 940 nm EE-SY171 sensor, all available from Omron Electronic Components LLC. Other suitable reflective sensors include a OPB609GU sensor available from OPTEC, a QRE1113GR sensor available from Fairchild Semiconductor, and a CNB1001 sensor available from Panasonic. In principal, higher sensor resolution can be achieved with shorter wavelength and more focused light energy. Using an ultraviolet (UV) emitter and/or laser, can provide such improved resolution.

In cases in which an optical sensor is employed, one or more of the gears 112, 114 can include a distinctive optical characteristic viewable by the sensor through the separation member 120. For example, the distinctive optical characteristic can be located on the top surface of the gears, adjacent to an interior surface 128 of the separation member 120. The distinctive optical characteristic can be any indication which results in the optical sensor registering a reading different from when the characteristic is not in view. For example, the top surface of each of the gears may have a different optical reflectance pattern at the sensor wavelength due to the use of different colors, materials of different reflectivity, or the use of one or more discrete dots on the surface of the gear(s).

For embodiments employing an optical sensor, the separation member 120 preferably comprises a material that is substantially transparent to radiation within the sensor wavelength range. For example, in some cases all of the separation member 120 may be substantially transparent in the sensor wavelength range. In certain embodiments, just a portion of the separation member 120 (e.g., a window or lens) may be substantially transparent in the sensor wavelength range. The separation member 120, optical sensor, and gears/chamber are preferably aligned to provide the optical sensor with an unimpeded view of at least part of the gears through a portion of the separation member substantially transparent to the sensor wavelength range. The sensor wavelength range includes wavelengths of radiation transmitted by the sensor emitter and detected by the sensor detector. For example, an optical sensor operating in a sensor wavelength range including near infrared radiation may utilize wavelengths ranging from about 700 nm to about 1100 nm or longer. Of course it will be appreciated that other wavelength ranges can also be used.

The term "substantially transparent" is used herein to describe a material for the separation member 120 that allows transmission of radiation into and out of the fluid chamber 106 to a sufficient degree such that the optical sensor is able to adequately detect motion of the gears based on the emitted and reflected radiation. Accordingly, the material need not transmit all or nearly all radiation within the sensor wavelength range, though in some cases it may approach this limit. In certain applications a material with a lower transmittance rating may be sufficient to enable adequate performance of the sensor, and such a material is considered substantially transparent in the sensor wavelength range for purposes of this description.

Figure 3:
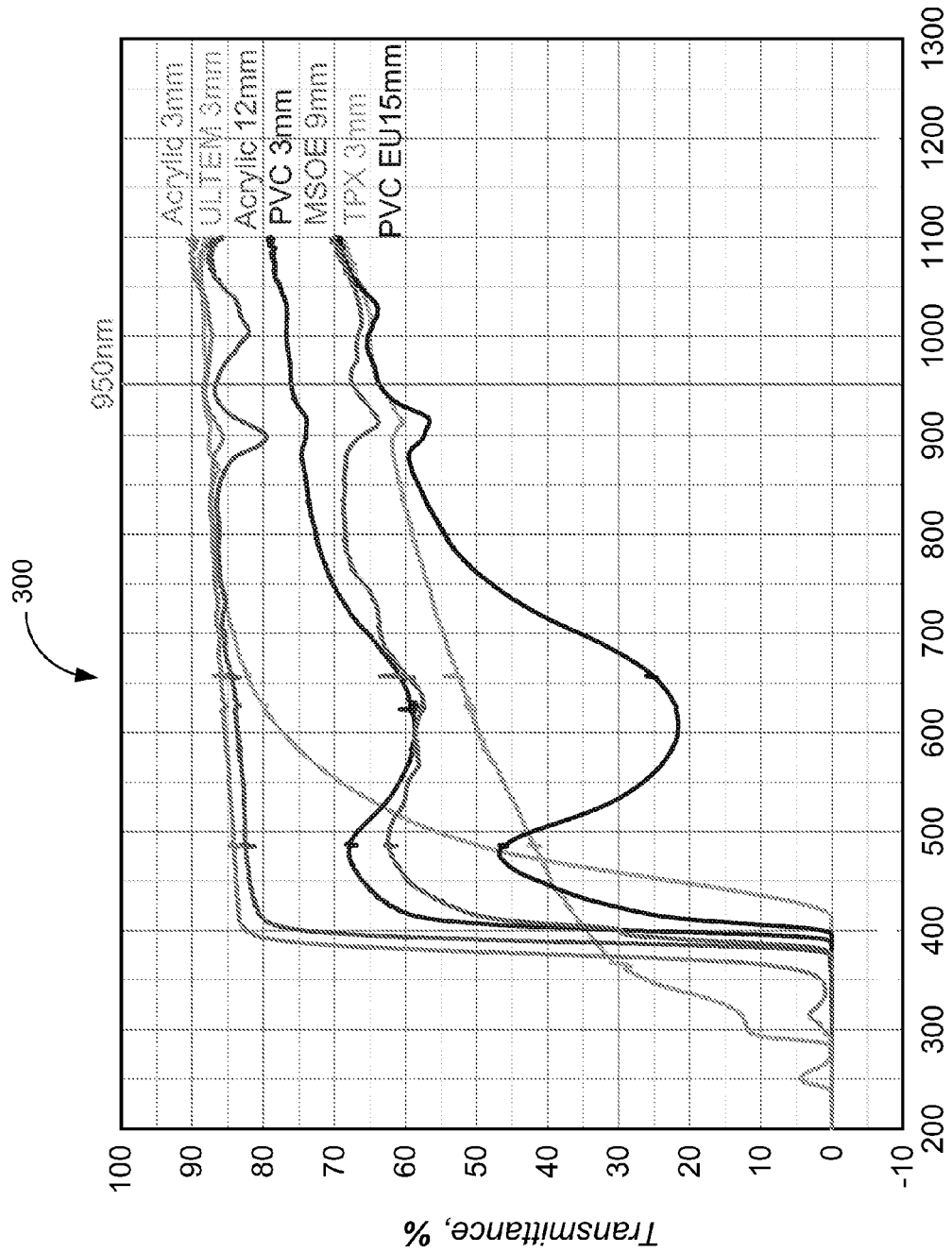
FIG. 3 is a plot of transmittance versus wavelength for several materials useful in embodiments of the invention.

FIG. 3 is a plot 300 showing the transmittance characteristics of several materials that may be useful for the separation member 120 when the sensor wavelength range is between about 700 nm and about 1100 nm or more. Most of the materials exhibit a transmittance of at least 50% in this range, a few at least 60%, and others at least 80% transmittance. Examples of materials that may be suitable for transmitting radiation in the 700 nm to 1100 nm range include glass, sapphire, borosilicate, polymethylpentene, polysulfone, polyetherimide, polypropylene, polycarbonate, polyester, PVC and acrylic glass. Of course varying levels of transmittance may be required or permitted by performance characteristics of the optical sensor, and it is possible that even lower transmittance ranges may be sufficient for extremely sensitive optical sensors and higher transmittance ranges may be necessary for less effective sensors.

The separation member 120 can be formed from a number of materials depending upon one or more design factors for a particular embodiment. As just a few examples, some criteria that may affect the choice of material for the separation member 120 include the particular fluid passing through the chamber 106, the pressure of the fluid flow, cost factors, and/or, in cases using an optical sensor, transparency criteria for the optical sensor wavelength range. For example, the separation member 120 should be made from one or more materials that are compatible and sufficiently chemically inert with respect to the fluids flowing through the chamber. For applications involving chemicals having a high pH, a low pH or strong oxidizers, the separation member 120 can, for example, be made from a very inert material like commercial grade clear sapphire or borosilicate. One example of a commercially available material is Borofloat, available from Precision Glass and Optics. In some cases the separation member can be formed solely or partially from one or more of the materials noted above, including glass, sapphire, borosilicate, polymethylpentene, polysulfone, polyetherimide, polypropylene, polycarbonate, polyester, PVC and acrylic glass. Other materials known in the art may also be used.

The design of the separation member 120 can also vary depending upon the application. Factors affecting the thickness of the separation member 120 can include the pressure of the fluid flowing through the chamber, the inherent strength of the material itself, and the support provided by the cover portion 104 which secures the separation member 120 to the base portion 102. In some cases, for example, the separation member 120 is a plate having a thickness of less than about 15 millimeters. In certain embodiments the thickness is between about 1 millimeter and about 2 millimeters. Of course it will be appreciated that other thicknesses may be appropriate depending upon the transmittance of the material, the strength of the material and other factors.

Returning to FIGS. 1 and 2, the cover portion 104 is attached to the base portion 102 and encapsulates the separation member 120 between the cover portion and the base portion. Thus the cover portion 104 provide a structural housing about the separation member, securing the separation member against the base portion 102 and chamber 106 without the need to directly fasten the separation member to the base portion (e.g., with screws, bolts, etc.). The cover portion 104 can be formed from the same material as the separation member or a different material. For example, the cover portion 104 may comprise a material such as glass, sapphire, borosilicate, and/or acrylic glass. In some cases the cover portion 104 is formed from a moldable plastic material such as polymethylpentene, polysulfone, polyetherimide, polypropylene, polycarbonate, polyester, and/or PVC.

In some cases the cover portion 104 preferably provides a strong structural housing about the separation member, allowing the separation member to be formed from different materials that may be weaker or more brittle, for example. The separation member 120 provides a separate seal for the fluid flow chamber 106, thus preventing the fluids flowing through the chamber from contacting the cover portion 104. Accordingly, the cover portion and the separation member can be formed from different materials. For example, the separation member can comprise a material that is compatible with the fluids flowing through the chamber, while the cover portion 104 can comprise a material that is structurally strong, though not necessarily compatible with the fluids. In some cases, for example, the separation member is formed from a first material that is more resistant to fluids flowing through the chamber than a second material used to form the cover portion.

In some cases the cover portion 104 is removably coupled to the base portion with, e.g., screws, bolts, or another removable fastener. Thus, the cover portion 104 can be removed from the base portion 102 to provide access to the separation member 120. This can be useful for cleaning or replacing the separation member. In some cases the flow meter 100 can be adapted to handle different fluids by removing one separation member and replacing it with another separation member without the need to replace the entire cover portion 104. For example, a separation member may be exchanged for another having more desirable operating capabilities (e.g., chemical resistance, pressure resistance, etc.) suitable for a particular application. Thus the use of a cover portion distinct from the separation member provides a degree of adaptability or interchangeability with respect to the separation member. It should be appreciated, though, that the cover portion does not need to be removable in all cases, and may instead be permanently fixed to the base portion about the separation member (e.g., with an adhesive, screws, bolts, etc.).

The separation member 120 and cover portion 104 may also exhibit a degree of visible transparency in some embodiments to allow an operator to visually observe operation of the flow meter 100. For example, the cover portion 104 and separation member 120 may be formed from a material that transmits a sufficient amount of visible light such that the first and/or the second gears are discernible through the cover portion and the separation member. In some cases the cover portion and separation member are substantially transparent to visible light, though lesser degrees of transparency (e.g., translucency) may also be sufficient in some cases to allow a person to at least discern movement of the gears. For example, the plot 300 in FIG. 3 illustrates the transparency of a number of materials that have between about 20% and about 90% transmittance in the visible range of 400 nm to 700 nm depending upon the nature and thickness of the material. In some cases the entire cover portion 104 and/or separation member 120 may be formed from such a material, though it is also contemplated that the cover portion and/or separation member may include a small transparent portion of the whole (e.g., a window) to allow a person to inspect operation of the gears.

Figure 4A:
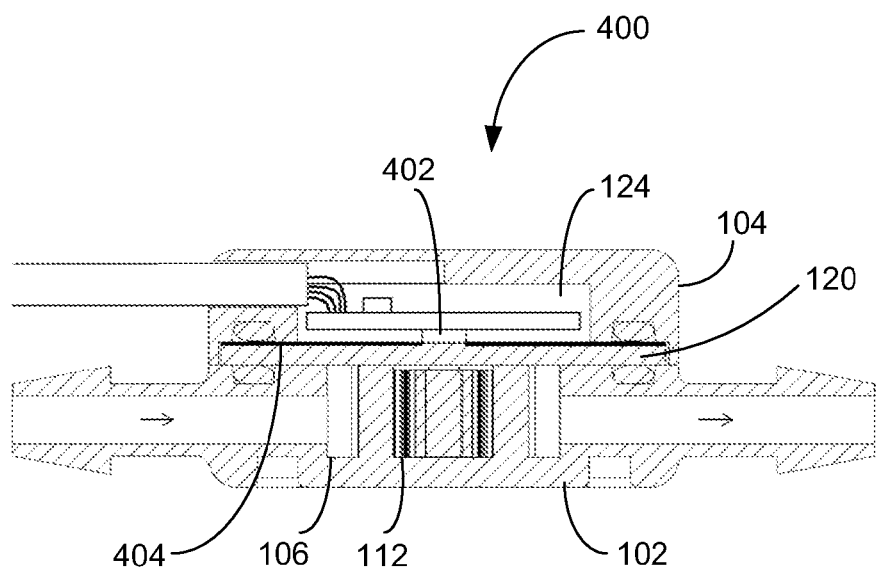
FIG. 4A is a side cross-sectional view of a flow meter including an optical filter according to an embodiment of the invention.
Figure 4B:
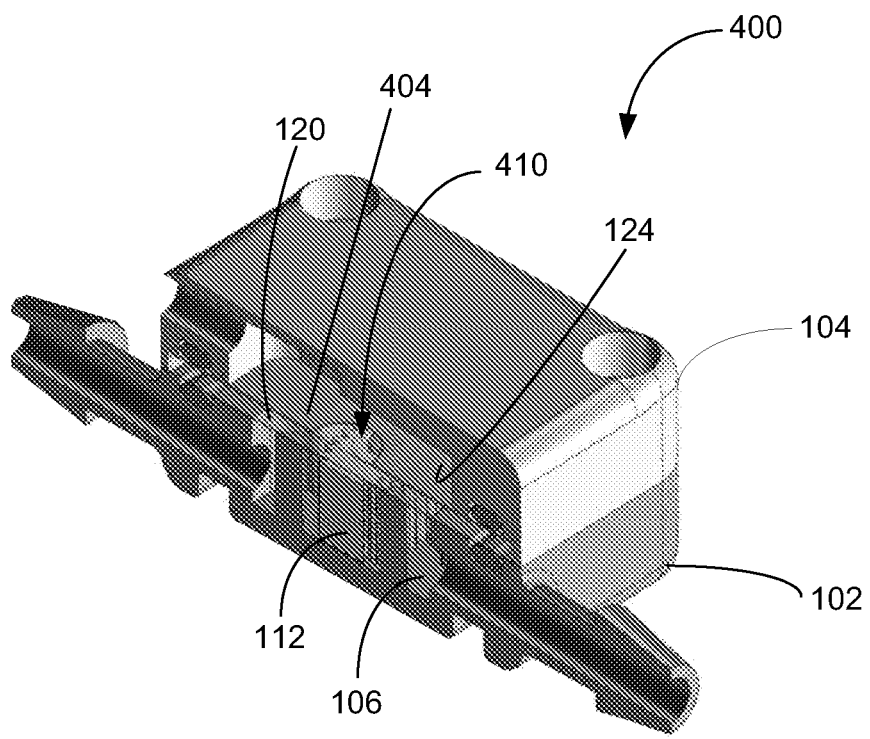
FIG. 4B is a perspective cross-sectional view of a flow meter including an optical filter according to an embodiment of the invention.

FIGS. 4A and 4B are side and perspective cross-sectional views of a flow meter 400 according to an embodiment of the invention. The flow meter 400 is similar in many respects to the flow meter 100 described with respect to FIGS. 1 and 2, but FIG. 4A also illustrates an optical sensor 402 positioned within the cavity 124 of the cover portion 104. The optical sensor 402 is adapted to detect movement of at least one of the gears 112, 114 by emitting and detecting light in a sensor wavelength range in the manner previously described. The flow meter 400 also includes an optical filter 404 positioned to limit radiation within the sensor wavelength range from entering the chamber 106 from outside the flow meter 400 or from otherwise interfering with operation of the optical sensor 402.

The optical filter 404 includes a material that is substantially opaque to the sensor wavelength range and thus selected to block out ambient radiation within the sensor wavelength range. In some cases it is an optical interference filter or an absorption filter. The filter need not block out all ambient radiation in the sensor wavelength range, though it may approach this limit in some cases. For example, in some cases the optical filter 404 may filter or transmit a sufficiently low amount of ambient sensor wavelength radiation so that it does not appreciably affect measurements taken by the optical sensor 402. The degree of necessary filtering may change depending upon the reflectance properties of the various material in the flow meter 400 as well as the sensitivity and settings of the optical sensor 402 and associated circuitry.

Figure 6:
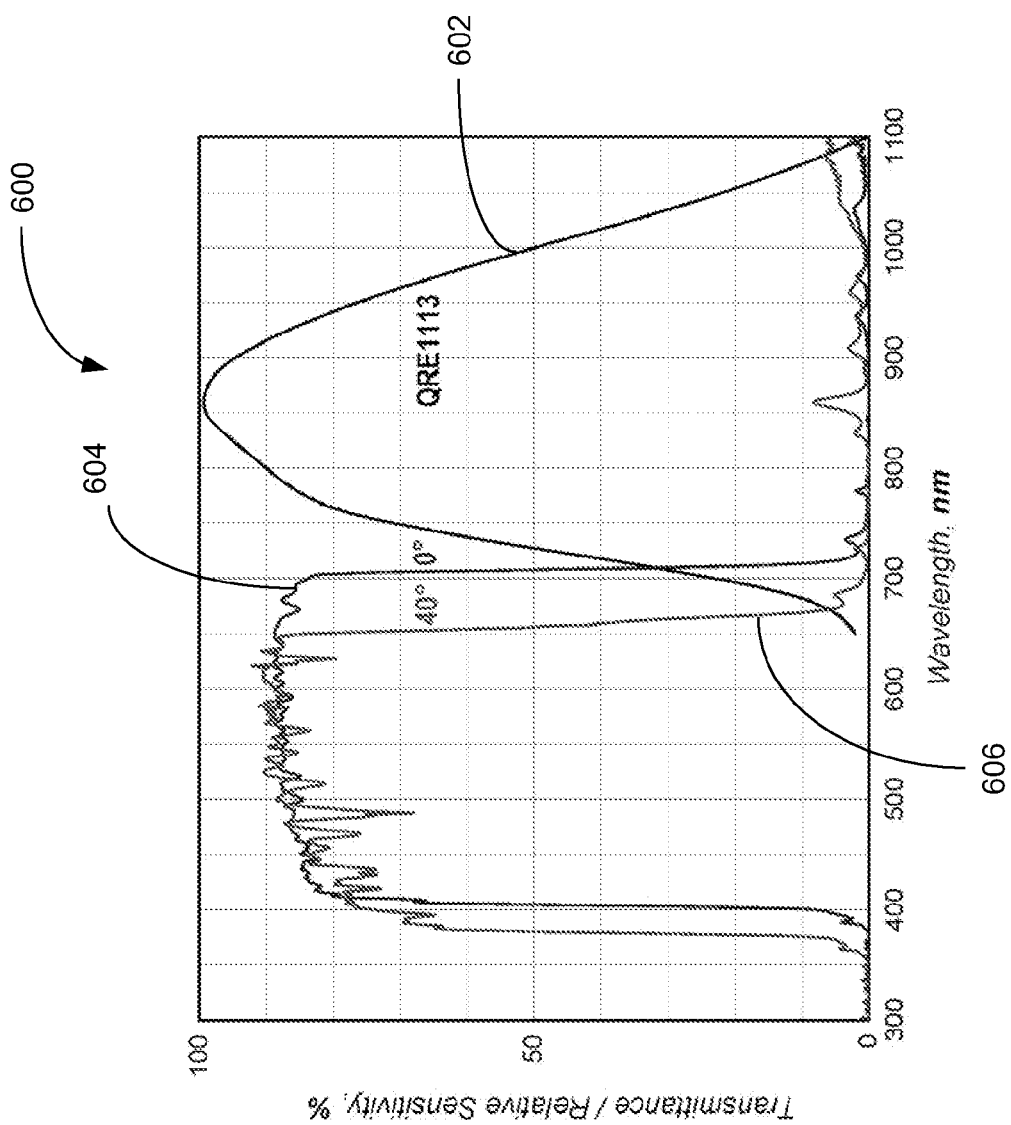
FIG. 6 is a plot of transmittance versus wavelength for an optical filter useful in embodiments of the invention.

FIG. 6 is a plot 600 illustrating the degree of filtering available for one example of a commercially available filter material called Super HeatBuster Hot Mirror, available from Deposition Sciences Inc. As shown in the plot 600, a sensitivity range 602 for a QRE1113 photoreflective sensor ranges between about 700 nm and about 1100 nm (i.e., infrared radiation in the illustrated embodiment). The optical filter transmits a minimal response for these infrared wavelengths for both zero degree ambient radiation 604 as well as radiation 606 entering at an angle of about 40 degrees. Such an optical filter can be useful for limiting the affect of ambient infrared radiation in settings with, e.g., intense incandescent light or sunlight.

Figure 4C:
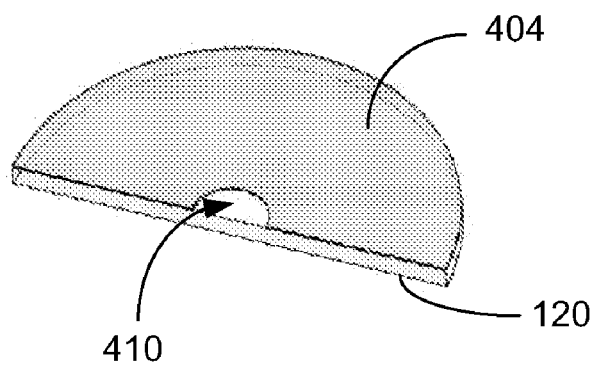
FIG. 4C is a perspective cross-sectional view of a separation member including an optical filter according to an embodiment of the invention.

As shown in FIGS. 4A-4C, in some cases the optical filter 404 is part of the separation member 120 or deposited directly on the exterior surface of the separation member 120. In this case, the optical filter 404 is positioned between the chamber 106 and the optical sensor 402. To avoid blocking desired sensor wavelength radiation from being transmitted to and/or from the sensor, a portion of the separation member 120 can have a viewing port 410 for the optical sensor 402 to look into the chamber 106. For example, a center section of the separation member 120 can have the optical filter media masked or physically removed to create the viewing port 410. In some cases the optical filter comprises a thin film deposited upon the separation member though other configurations are possible.

Figure 5:
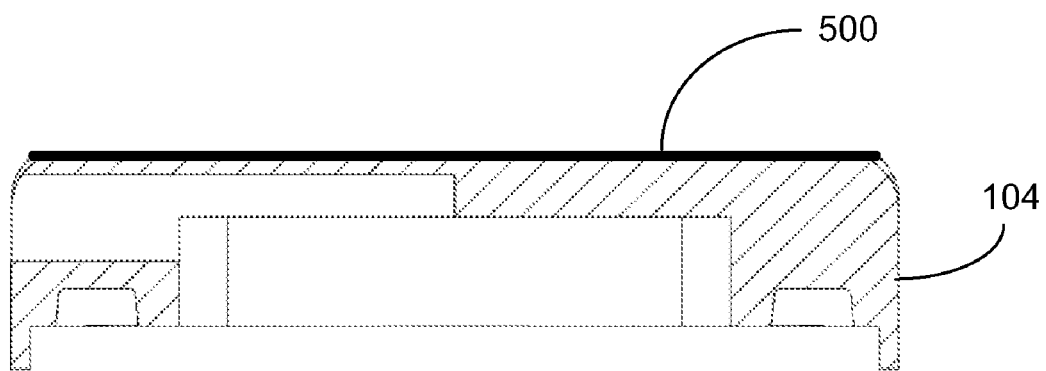
FIG. 5 is a side cross-sectional view of a cover portion including an optical filter according to an embodiment of the invention.

Turning to FIG. 5, in some cases an optical filter 500 is positioned adjacent an exterior surface of the cover portion 104. For example, the filter 500 can be a thin film deposited on the cover portion. Thus, the cover portion 104 itself provides some shielding from ambient radiation within the sensor wavelength range without the need for incorporating the optical filter into the separation member 120. This can help reduce costs in that different types of separation members (e.g., as discussed above) can be designed and manufactured without the need for an optical filter on each separation member. Instead the optical filter 500 is applied once to the exterior of the cover portion 104. Of course, it should be appreciated that other positions for the optical filter are possible and that these are just examples of some suitable locations.

In some cases the optical filter selectively blocks (e.g., reflects and/or absorbs) radiation within the sensor wavelength range while also transmitting radiation within the visible range of wavelengths. As shown in FIG. 6, for example, the optical filter blocks radiation within the range of about 700 nm to about 1100 nm (the sensitivity region for the optical sensor) but also substantially transmits visible radiation within the 400 nm to 700 nm wavelength range depending slightly upon the viewing angle. Accordingly, such an optical filter can be combined with a separation member and cover portion that also exhibit a degree of visible transparency to allow an operator to visually observe operation of the flow meter 100, while also reducing the impact of ambient radiation within the sensor wavelength range.

Figure 7:
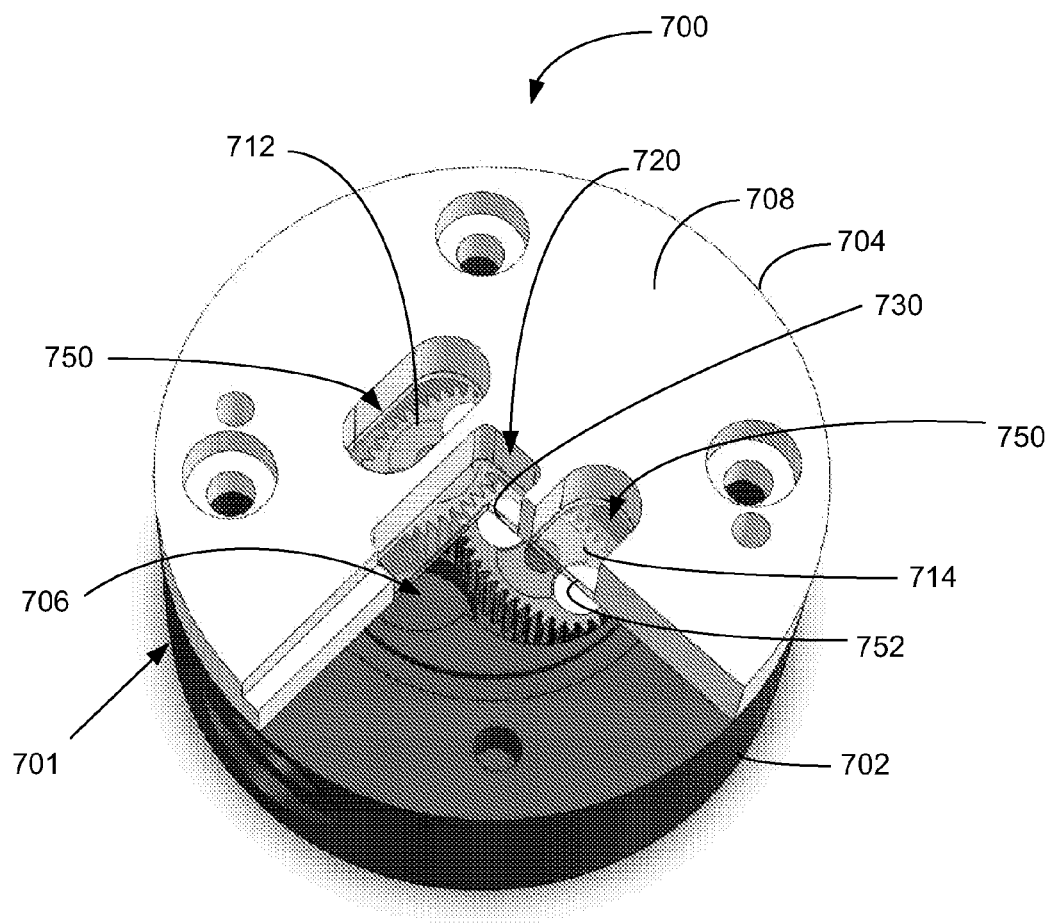
FIG. 7 is a perspective view of a flow meter according to an embodiment of the invention.
Figure 8A:
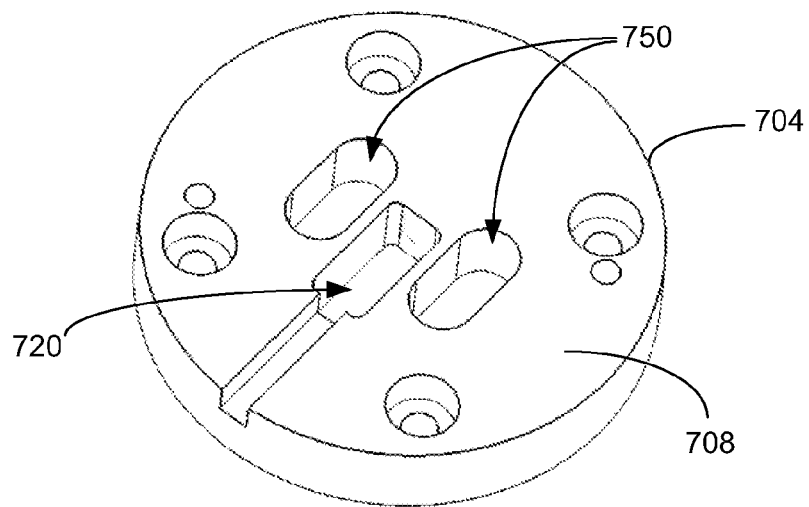
FIG. 8A is a perspective view of a cover portion according to an embodiment of the invention.
Figure 8B:
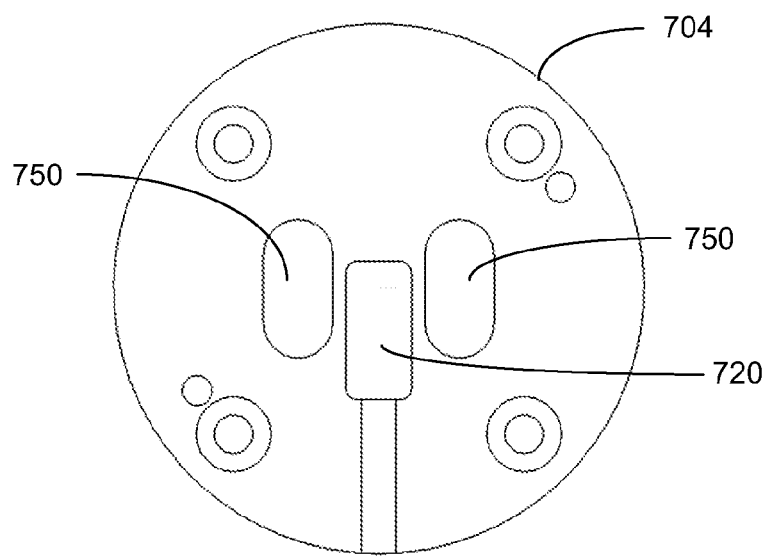
FIG. 8B is a top view of the cover portion of FIG. 8A.
Figure 8C:
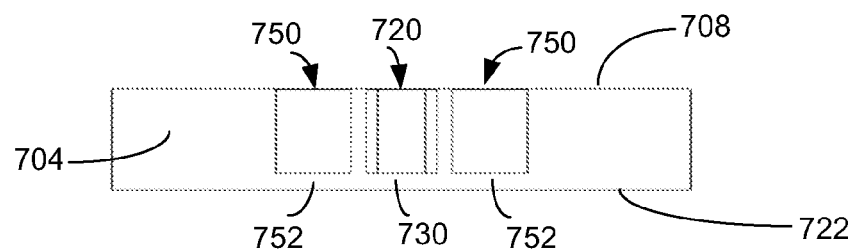
FIG. 8C is a side cross-sectional view of the cover portion of FIG. 8A.

FIG. 7 is a perspective view of a flow meter 700 according to an embodiment of the invention. FIG. 7 illustrates a cover portion 704 of the flow meter 700 in partial cross-section. The flow meter 700 includes a housing 701 that defines a chamber 706 having a fluid inlet and a fluid outlet. The housing 701 includes a base portion 702 and the cover portion 704 mounted to the base portion 702 with a fastener such as, e.g., screws or bolts (now shown). The cover portion 704 has a continuous interior surface that forms a wall of the chamber 706. The cover portion also has an exterior surface 708 opposite the interior surface. First and second gears 712, 714 are rotatably installed within the chamber 706 about axes of rotation and rotate in response to fluid flowing through the chamber 706. Although not shown, the flow meter 700 usually includes a non-contact sensor located outside of the chamber 706 and configured to detect movement of at least one of the gears within the chamber. For example, the non-contact sensor can be mounted within a sensor cavity 720 within the cover portion 704.

As shown in FIG. 7, in some embodiments the cover portion 704 directly attaches to the base portion 702 and provides a wall of the chamber 706 without the use of a discrete separation member as described with respect to other embodiments of the invention. An elastomer o-ring or other sealing mechanism (not shown) can enhance the seal between the base and cover portions. As shown in FIGS. 7 and 8A-8C, the sensor cavity 720 of the cover portion 704 extends into the cover portion from its exterior surface 708, but does not extend through the cover portion in order to leave the interior surface 722 of the cover portion intact, thus providing a continuous surface or wall that seals one side of the chamber 706.

The cover portion 704 is preferably formed from a material that is compatible with both fluids flowing through the chamber 706 and the non-contact sensor positioned within the sensor cavity 720. For example, the thin sensor cavity wall 730 should allow the non-contact sensor to adequately sense movement of one or both of the gears 712, 714. In the case of a magnetic sensor, the cavity wall 730 should adequately transmit magnetic fields (e.g., be formed from a non-magnetic or non-metallic material) such that the sensor can receive and sense magnetic field changes caused by movement of the gears. In the case of an optical sensor, the cavity wall 730 should substantially transmit radiation within the sensor wavelength range so that the sensor can adequately emit and receive sensor wavelength radiation. For example, in the case of an infrared optical sensor (such as one of those previously mentioned) the cavity wall 730 should be substantially transparent to the infrared wavelengths at use. In some cases the cover portion 704 is formed from polypropylene, which is substantially transparent to radiation within the infrared wavelength range.

In addition, the sensor cavity wall 730, along with the entire interior surface 722 of the cover portion, should be compatible with fluids flowing through the chamber 706. For example, the interior surface of the cover portion 704 should be made from one or more materials that are sufficiently chemically inert with respect to the fluids flowing through the chamber. This can be useful for a number of applications, including those involving chemicals having a high pH, a low pH or strong oxidizers. A number of materials can be selected for the cover portion depending upon the desired resistance to fluids and the desired compatibility with the non-contact sensor. As just one example, the cover portion 704 can be formed from polypropylene when the non-contact sensor is an optical sensor operating in the infrared range and the liquid chemicals are particular types of laundry detergents. In some cases an optical filter, such as the one discussed with reference to FIG. 5, is also included to block ambient light that may affect performance of an optical sensor.

The cover portion 704 may also exhibit a degree of visible transparency in some embodiments to allow an operator to visually observe operation of the flow meter 700. For example, the cover portion 704 may include a material that transmits a sufficient amount of visible light such that the first and/or the second gears are discernible through the cover portion. In some cases it is preferable that the cover portion 704 provides a structurally strong component of the flow meter's housing 701, while also being resistant (e.g., inert) to chemicals flowing through the chamber, as well as visibly transparent to allow an operator to observe movement of the gears.

As shown in FIGS. 7 and 8A-8C, in some embodiments the cover portion includes one or more viewing cavities 750, which allow discernment of one or both gears within the chamber 706. The cavities 750 extend into the cover portion 704 from the exterior surface 708, but do not extend through the interior surface 722. The cavities thus form a thin viewing wall 752 adjacent the interior surface of the cover portion 704. Such thin walls 752 can provide a degree of transparency that allow discernment of the first and/or the second gears through the cover portion from outside the housing 701. For example, a normally translucent material such as polypropylene may normally obscure vision through a thickness of the material. Forming a cavity and a sufficiently thin section in a polypropylene cover portion can enable viewing into the chamber 706 as illustrated in FIG. 7. While FIGS. 7 and 8A-8C illustrate a cover portion with multiple viewing cavities 750, it should be appreciated that a single viewing cavity may also be used, or that a similar cover portion may be provided without a viewing cavity.

Although not shown in the figures, in some embodiments a cover portion having one or more viewing cavities can be used in conjunction with a separation member such as the separation member described with respect to FIGS. 1 and 2. For example, is may be desirable to form the cover portion out of a nontransparent material (e.g., a translucent material) for various design factors such as cost, material strength, etc. In such cases a viewing cavity can be formed extending into the cover portion from the exterior surface. In some cases the cavity may not extend through the interior surface of the cover portion, similar to the example shown in FIGS. 7 and 8A-8C. In some cases, the cavity can extend entirely through the cover portion since the separation member is positioned between the cover portion and base portion to seal the fluid chamber.

Methods for measuring a fluid are also provided according to some embodiments of the invention. In some cases a method includes providing a flow meter, such as one of those previously described, having a chamber in fluid communication with a fluid source and an optical sensor outside of the chamber. The chamber includes a fluid inlet, a fluid outlet, first and second gears, and a wall with at least a portion of the wall being substantially transparent to a sensor wavelength range used by the optical sensor. Fluid is dispensed into the chamber, causing the first and the second gears to rotate. The method includes reducing (or substantially blocking) transmission of radiation in the sensor wavelength range from outside the flow meter into the chamber. For example, an optical filter such as one of those described above may be provided. Further, the optical sensor emits radiation in the sensor wavelength range into the chamber and detects radiation reflected back from the chamber. The method further includes measuring rotation of the first and/or second gear based on the detected radiation and calculating a measure of the fluid based upon the measured rotation. For example, evaluation electronics associated with the sensor may calculate a flow rate, flow volume and/or flow direction based on the detected radiation. In some cases the method also provides for visibly viewing rotation of the first gear and/or the second gear from outside the flow meter.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A flow meter for measuring fluid comprising:
  a housing defining a chamber having a fluid inlet and a fluid outlet, the housing comprising a cover portion and a separation member positioned between the cover portion and the chamber, the separation member comprising a continuous interior surface forming a wall of the chamber;
  first and second gears installed within the chamber, the first and the second gears being rotatable about respective first and second axes of rotation in response to fluid flow through the chamber; and a non-contact sensor carried by the cover portion and located outside of the chamber, the non-contact-sensor configured to detect movement of at least one of the first and second gears.

2. The flow meter of claim 1, wherein the non-contact sensor is an optical sensor comprising an emitter configured to emit radiation in a sensor wavelength range and a detector configured to detect radiation in the sensor wavelength range, wherein at least a portion of the separation member is substantially transparent to the sensor wavelength range.

3. The flow meter of claim 2, further comprising an optical filter comprising a material substantially opaque to the sensor wavelength range, the optical filter positioned to limit radiation within the sensor wavelength range from entering the chamber from outside the flow meter.

4. The flow meter of claim 3, wherein the optical filter is positioned adjacent an exterior surface of the cover portion.

5. The flow meter of claim 3, wherein the separation member comprises the optical filter.

6. The flow meter of claim 3, wherein the sensor wavelength range comprises infrared radiation.

7. The flow meter of claim 3, wherein the optical filter comprises a film.

8. The flow meter of claim 1, wherein the separation member comprises a first material and the cover portion comprises a second material different from the first material.

9. The flow meter of claim 8, wherein the first material is more resistant to fluids flowing through the chamber than the second material.

10. The flow meter of claim 8, wherein the separation member and the cover portion transmit a sufficient amount of visible light such that the first gear and/or the second gear is discernible through the cover portion and the separation member.

11. The flow meter of claim 10, wherein the first material and the second material are substantially transparent to visible light.

12. The flow meter of claim 8, wherein the first material and the second material are selected from the group consisting of glass, sapphire, borosilicate, polymethylpentene, polysulfone, polyetherimide, polypropylene, polycarbonate, polyester, PVC and acrylic glass.

13. The flow meter of claim 8, wherein the second material is nontransparent and the cover portion comprises at least one cavity extending into the cover portion.

14. The flow meter of claim 13, wherein the at least one cavity extends entirely through the cover portion.

15. The flow meter of claim 8, wherein the separation member comprises a plate having a thickness of less than about 15 millimeters.

16. The flow meter of claim 15, wherein the thickness is between about 1 millimeter and about 2 millimeters.

17. The flow meter of claim 1, wherein the separation member and the cover portion are removable.

18. The flow meter of claim 1, wherein the non-contact sensor is a magnetic sensor.

19. A flow meter for measuring fluid comprising:
a housing defining a chamber having a fluid inlet and a fluid outlet;
first and second gears installed within the chamber, the first and the second gears being rotatable about respective first and second axes of rotation in response to fluid flow through the chamber; and
a non-contact sensor located outside of the chamber, the non-contact-sensor configured to detect movement of at least one of the first and second gears, wherein the housing comprises a cover portion having an interior surface forming a wall of the chamber and an exterior surface, the cover portion defining a cavity extending into the cover portion from the exterior surface but not through the interior surface, the cavity allowing discernment of the first gear and/or the second gear from outside the housing.

20. The flow meter of claim 19, wherein the cover portion comprises a translucent material.

21. The flow meter of claim 19, wherein the non-contact sensor is an optical sensor comprising an emitter configured to emit radiation in a sensor wavelength range and a detector configured to detect radiation in the sensor wavelength range, wherein at least part of the cover portion is substantially transparent to the sensor wavelength range.

22. The flow meter of claim 21, further comprising an optical filter comprising a material substantially opaque to the sensor wavelength range, the optical filter positioned adjacent the exterior surface of the cover portion to limit radiation within the sensor wavelength range from entering the chamber from outside the flow meter.

23. A flow meter for measuring fluid comprising:
a housing comprising
a base portion defining a chamber having a fluid inlet and a fluid outlet,
a separation member adjacent the base portion, the separation member comprising a continuous interior surface forming a wall of the chamber, and
a cover portion adjacent an exterior surface of the separation member;
first and second gears installed within the chamber, the first and the second gears being rotatable about respective first and second axes of rotation in response to fluid flow through the chamber;
an optical sensor carried by the cover portion, the optical sensor comprising an emitter configured to emit radiation in a sensor wavelength range and a detector configured to detect radiation in the sensor wavelength range, wherein at least a portion of the separation member is substantially transparent to the sensor wavelength range; and
an optical filter comprising a material substantially opaque to the sensor wavelength range, the optical filter positioned to limit radiation within the sensor wavelength range from entering the chamber from outside the flow meter, wherein
the separation member comprises a first material and the cover portion comprises a second material different from the first material, wherein
the separation member and the cover portion transmit a sufficient amount of visible light such that the first gear and/or the second gear is discernible through the cover portion and the separation member.

24. A method for measuring a fluid comprising:
providing a flow meter having a chamber in fluid communication with a fluid source and an optical sensor outside of the chamber, the chamber comprising a fluid inlet, a fluid outlet, first and second gears, and a wall with at least a portion of the wall being substantially transparent to a sensor wavelength range;
dispensing the fluid through the chamber causing the first and the second gears to rotate as the fluid passes through the chamber from fluid inlet to fluid outlet;
reducing transmission from outside the flow meter into the chamber of radiation in the sensor wavelength range;

emitting radiation in the sensor wavelength range into the chamber with the optical sensor;

detecting radiation in the sensor wavelength range from the chamber with the optical sensor;

measuring rotation of the first and/or second gear based on the detected radiation; and calculating a measure of the fluid based upon the measured rotation.

25. The method of claim 24, further comprising substantially blocking transmission from outside the flow meter into the chamber of radiation in the sensor wavelength range.

26. The method of claim 24, further comprising visibly viewing rotation of the first gear and/or the second gear from outside the flow meter.

* * * * *